United States Patent [19]

Winter et al.

[11] Patent Number: 5,095,398

[45] Date of Patent: Mar. 10, 1992

[54] ELECTRICAL CIRCUIT BREAKER PROTECTION DEVICE

[75] Inventors: John M. Winter; D. Chris Higgins, both of Cedar Rapids, Iowa

[73] Assignee: Square D Company, Palatine, Ill.

[21] Appl. No.: 478,385

[22] Filed: Feb. 12, 1990

[51] Int. Cl.$^5$ .............................................. H02H 3/08
[52] U.S. Cl. ...................................... 361/42; 361/93
[58] Field of Search .................. 301/42, 102; 361/44, 361/45, 49, 42, 86, 93, 102

[56] References Cited

U.S. PATENT DOCUMENTS

| | | | |
|---|---|---|---|
| 3,812,400 | 5/1974 | Gryctko et al. | 317/18 D |
| 3,855,502 | 12/1974 | Pardue et al. | 317/18 D |
| 3,999,103 | 12/1976 | Misencik et al. | 317/18 D |
| 4,208,689 | 6/1980 | Dunham | 361/48 |
| 4,568,899 | 2/1986 | May et al. | 335/18 |
| 4,641,217 | 2/1987 | Morris et al. | 361/45 |
| 4,667,263 | 5/1987 | Morris et al. | 361/42 |
| 4,933,801 | 6/1990 | Glennon | 361/45 |
| 5,016,135 | 5/1991 | Zylstra | 361/156 |

Primary Examiner—Steven L. Stephan
Assistant Examiner—Adolf Berhane
Attorney, Agent, or Firm—Larry I. Golden; Jose W. Jimenez

[57] ABSTRACT

An equipment protection device for a multi pole circuit breaker includes a trip coil, having a plunger with a tang, in an adapter housing that is attached to the breaker housing for tripping the breaker load contacts by means of the tang. The tang extends through an aperture in the side of the breaker. The trip coil is controlled by a toroid that is in a remote housing, displaced from the breaker housing and which includes a sensing winding on the magnetic core of the toroid. A ground fault carrying conductor is passed through the toroid window and connects the neutral of the breaker panel to an earth ground. A test button on the adapter housing completes a circuit for supplying current to a test winding on the toroid to simulate a ground fault condition. The trip coil has two independent windings that are individually connected to the load contacts of the breaker such that either winding can operate the trip coil.

6 Claims, 5 Drawing Sheets

ELECTRICAL CIRCUIT BREAKER PROTECTION DEVICE

BACKGROUND OF THE INVENTION AND PRIOR ART

This invention relates generally to electrical power distribution equipment and particularly to a ground fault adapter for providing ground fault protection for a circuit breaker panel. Circuit arrangements for protecting against ground fault currents are well known in the art. One prior art device manufactured by Square D Company is a two pole circuit breaker with built-in ground fault detection comprising a magnetic toroid having a window through which the phase and neutral wires are passed. The neutral wire from the breaker is connected to an earth ground. Any unbalanced current flow in the wires passing through the toroid window is sensed by a sensing winding on the toroid and, if in excess of a threshold value, fires an SCR to connect a trip coil across one of the phases to ground. The trip coil operates a plunger that mechanically trips its associated pole of the breaker. The arrangement includes a pair of trip coils with one each being connected to a phase of the load circuit. The breaker poles are mechanically interconnected so that tripping of one pole results in tripping of the other pole. The two trip coils are provided to insure that tripping occurs in the event of a fault, even if one of the phases is de-energized. There is a perceived need for a ground fault protection device as an accessory for standard circuit breakers.

SUMMARY OF THE INVENTION

The protection device of the present invention is mounted on the load side of the circuit breaker and interconnected via a cable to a remote housing that includes a toroid, through the window of which a conductor is passed which interconnects the neutral wire of the breaker panel to an earth ground. The earth ground is connected to the ground strap on the back of the circuit breaker panel and any ground fault currents must therefore flow through the window of the toroid. The ground fault adapter mechanism has a trip coil with two separate windings that are individually connected to the two phase wires of the load circuit. The coils are connected to the AC or unpolarized terminals of a bridge rectifier. The polarized terminals of the bridge are connected to an SCR that is fired in response to a signal developed by the sensing winding on the toroid. The trip coil has a plunger that operates the trip mechanism of the breaker. Thus with the present invention a simple, single-trip-coil, add-on ground fault protection adapter is made available for standard circuit breakers. The standard breaker needs only a small additional aperture in its side to permit actuation of the trip mechanism by a right angle tang on the end of the trip coil plunger.

OBJECTS OF THE INVENTION

A principal object of the invention is to provide a novel ground fault protection adapter for a circuit breaker mechanism.

Another object of the invention is to provide a simple ground fault protection adapter for use in conjunction with standard circuit breakers.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
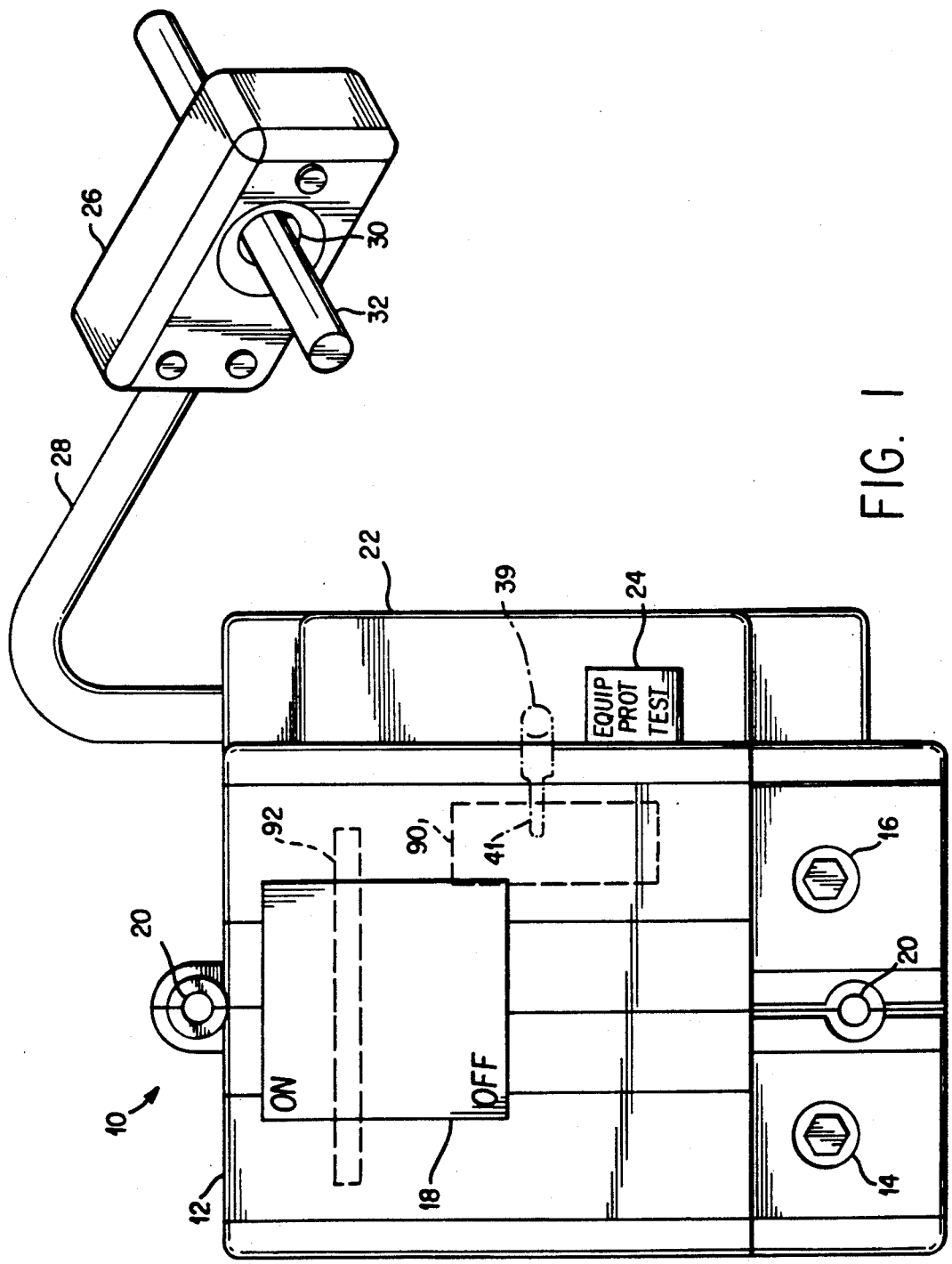
FIG. 1 is pictorial showing of a circuit breaker with the equipment protection device of the invention attached.

Referring to FIG. 1, a conventional, i.e. standard, two-pole circuit breaker 10 is shown. Breaker 10 includes a bakelite housing 12 and a pair of load terminal screw connectors 14 and 16. It will be understood that the circuit breaker includes conventional load contact sets and an operating mechanism 92 for simultaneously opening and closing the contact sets by manipulation of a common handle 18. Circuit breaker 10 also includes a mechanical trip mechanism 90 for opening the load contact set in the event of an overcurrent condition. The trip mechanism for the right hand one of the load contact sets (neither of which are shown) is engageable by a tang 41 on a plunger 39 of the trip coil of the invention, as will be seen. The breaker housing 12 may be secured to any convenient surface by means of a pair of mounting apertures 20 and suitable fasteners (not shown). Attached to the right side of the breaker housing 12 is the ground fault adapter housing 22. A push button 24, for testing the operation of the ground fault protection device, is included on the surface of adapter housing 22. A cable 28 interconnects the adapter housing 22 to a remote housing 26 that includes a toroid having a window 30 through which a ground fault conductor 32 is passed. As its name implies, remote housing 26 may be located a short distance from circuit breaker 10 and adapter housing 22 to access the breaker panel ground strap and an earth ground.

Figure 2:
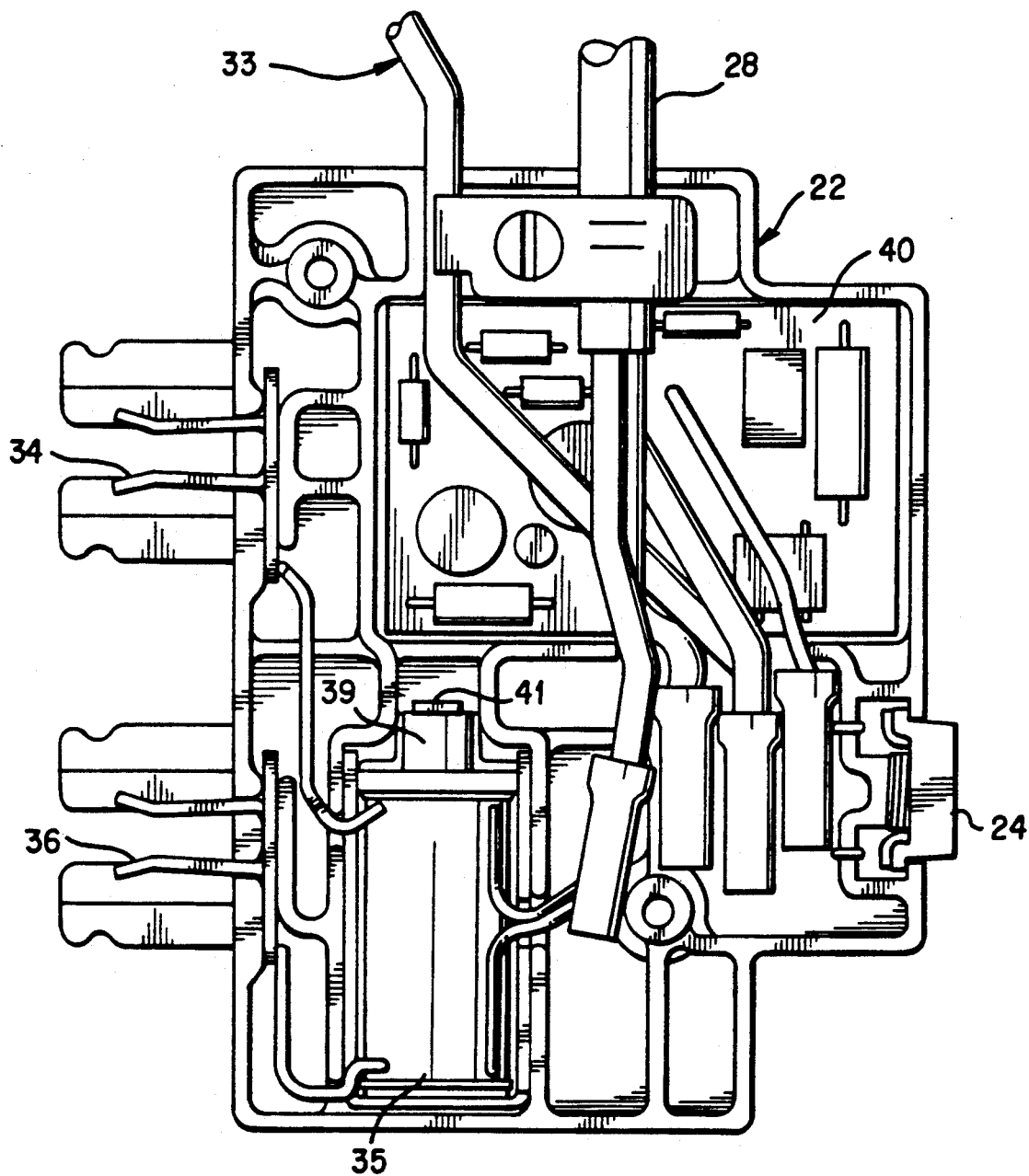
FIG. 2 is a view of the ground fault adapter housing showing the various components therein.
Figure 3:
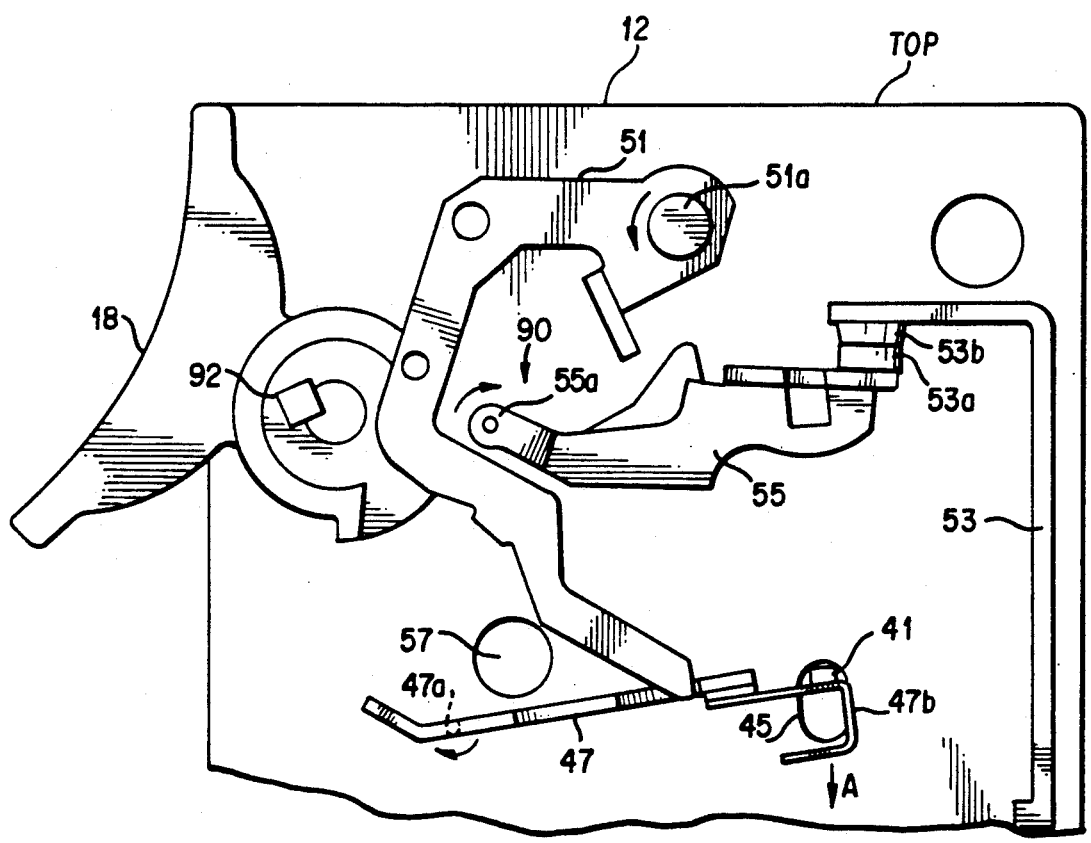
FIG. 3 is a partial interior view of the breaker trip mechanism.

In FIG. 2, the interior of adapter housing 22 is shown. A pair of electrical stabs or jacks 34 and 36 make contact with the phase bus bars in the breaker panel (not shown) and a heavy lead 33 provides a neutral connection. A trip coil 35 includes a plunger 39 having a right angle tang 41 for engaging the right hand breaker trip mechanism 90 by means of an aperture in the right hand wall of the breaker (FIG. 3). As will be described, the trip coil has two separate energizing windings that are connected between the phase stabs 34, 36 and neutral 33. A circuit board 40 includes components and circuitry that function to amplify the ground fault current sensed by the sensing winding on the toroid and for energizing trip coil 35 by connecting one of its windings in an energizing path.

FIG. 3 partially illustrates the trip mechanism 90 of the right hand breaker. Tang 41 from plunger 39 enters the breaker side through an aperture 45 and engages a U-shaped end 47b of an aperture 47 that is pivotally mounted at 47a. Armature 47 latches a trip lever 51 that is pivotally mounted at 51a. A blade 55 carries a movable contact 53a that is shown in electrical engagement with a stationary contact 53b that is connected to electrical conductor 53. Blade 55 is pivotally mounted at 55a. When tang 41 moves in the direction of the arrow A, responsive to operation of plunger 39 (FIG. 2), armature 47 pivots clockwise about pivot 47a and delatches trip lever 51. Trip lever 51 rotates counterclockwise about pivot 51a and causes blade 55 to pivot clockwise about pivot 55a and open contacts 53a-53b. A trip cam (not shown) fits into a pivot hole 57 and is activated by trip lever 51 to cam corresponding armatures in the other breakers so that all breakers open in response to a ground fault current interruption. The trip mechanism operation is well known in the art and needs no further description here.

Figure 4:
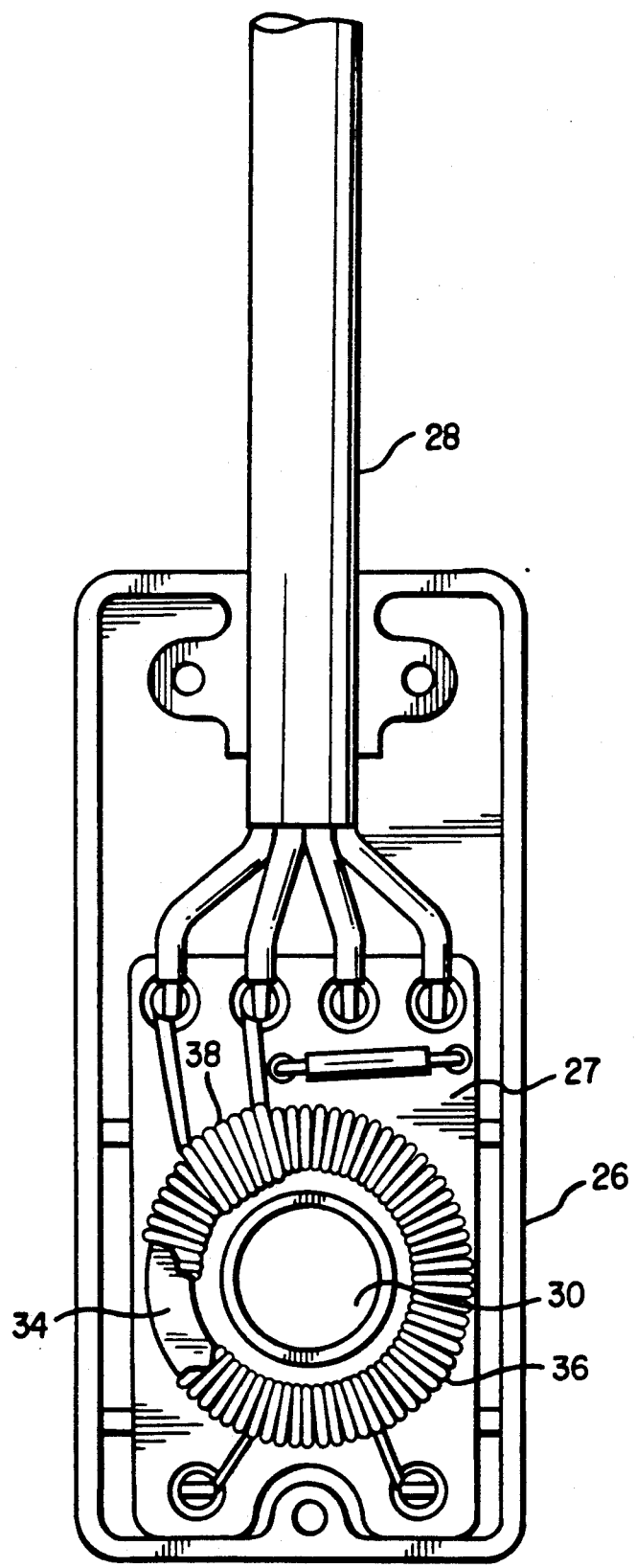
FIG. 4 is a view of the remote toroid housing.

In FIG. 4, the interior of the remote housing 26 includes a circuit board 27 upon which are mounted electrical components including a toroid 34 of magnetically permeable material that has a sensing winding 36 and a test winding 38 wound thereon. The windings are coupled to circuitry in adapter housing 22 by means of cable 28.

Figure 5:
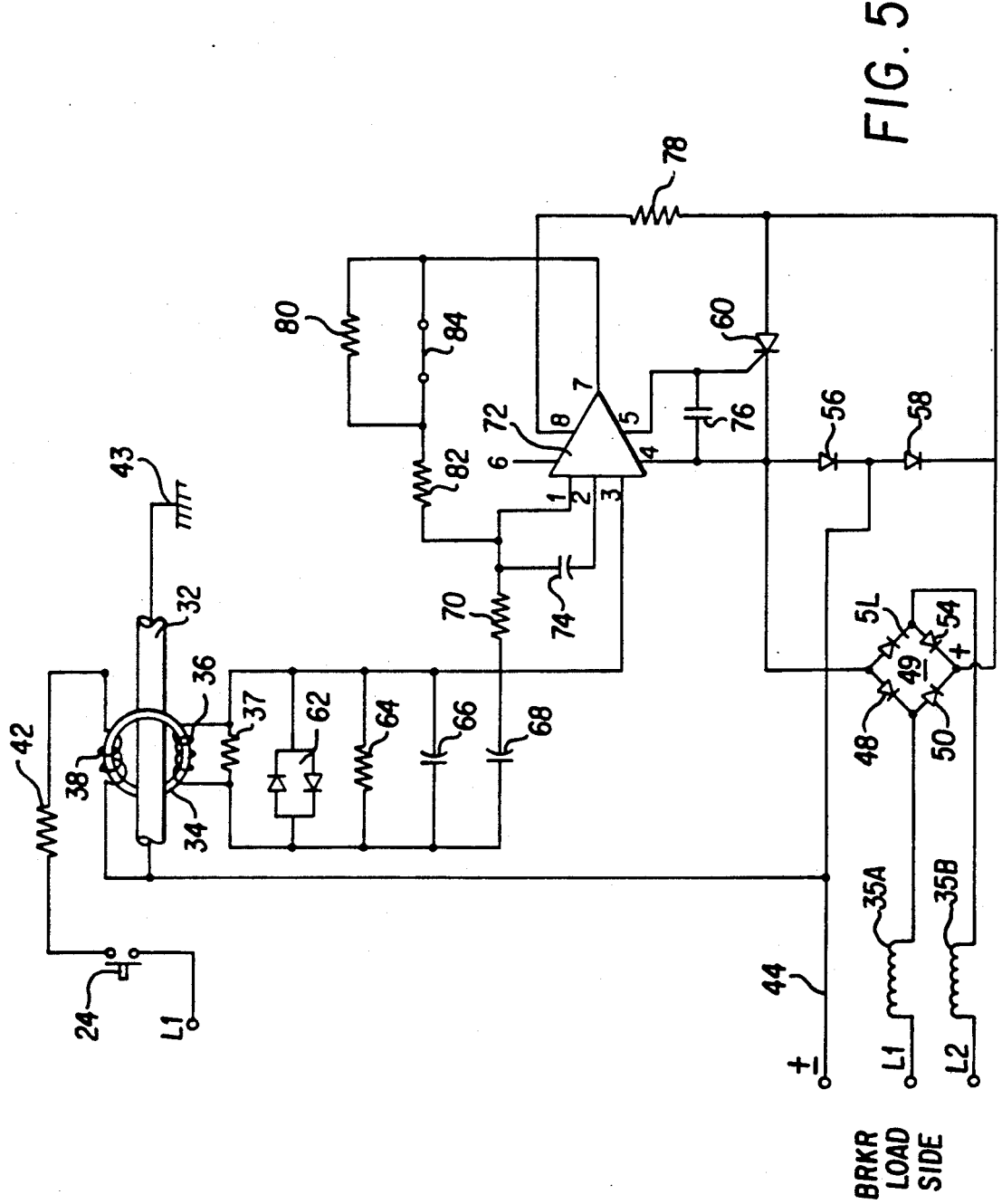
FIG. 5 is a partial schematic diagram of the ground fault interruption circuitry.

FIG. 5 reveals the various elements of the circuit arrangement which include load contacts L1 and L2 and a neutral lead 44. A pair of windings 35A and 35B comprise the energizing windings for trip coil 38 and are connected across the AC (non polarized terminals) of a bridge rectifier 49 comprising rectifiers 48, 50, 52 and 54. The polarized, opposite terminals of bridge rectifier 49 are connected to a pair of series connected diodes 56 and 58, with the junction of the diodes being connected to neutral lead 44. An SCR 60 has its anode-cathode circuit connected across diodes 56 and 58 and its gate connected to pin 5 of an operational amplifier 72. The cathode of SCR 60 is also connected to pin 4 of operational amplifier 72 and, through a capacitor 76, to the gate of SCR 60. The anode of SCR 60 is connected through a resistor 78 to pin 8 of operational amplifier 72. Pin 7 is connected back to pin 1 through a series combination of feedback resistors 80 and 82. Pin 1 is connected through a capacitor 74 to pin 2 and pin 6 is not connected. A conductive foil 84 shorts out feedback resistor 80 and may be interrupted or severed in order to change the gain of operational amplifier 72.

Momentary contact push button switch 24 connects L1, via a resistor 42, to test winding 38 on toroid 34. The other end of test winding 38 is connected to neutral lead 44. A ground fault current carrying conductor 32 is connected to neutral lead 44 at one end, passes through the window 30 of toroid 34 and connected to an earth ground 43 at its other end. Sensing winding 36 is connected across a load resistor 37 and a parallel arrangement of a pair of reverse connected diodes 62, a resistor 64 and a capacitor 66. One end of capacitor 66 is connected to terminal 3 of operational amplifier 72 and its other end is connected, through a capacitor 68 and a resistor 70, to terminal 1 of operational amplifier 72.

In operation, ground fault current flowing in conductor 32 establishes a magnetic field in toroid 34 which is sensed by sensing winding 36 and a voltage is developed across resistor 37. A filtering action is performed by diodes 62, resistor 64 and capacitor 66 and a signal is applied across terminals 1 and 3 of operational amplifier 72. The gain of operational amplifier 72 is established by feedback resistors 80 and 82 and, as previously discussed, may be changed by interrupting (i.e. severing) the foil connection 84 to remove the short circuit across resistor 80. Assuming a ground fault current above a predetermined threshold is flowing in conductor 32, the gate of SCR 60 is fired by operational amplifier 72. SCR 60 conducts and completes a circuit, via the rectifier bridge 49, to one or both of trip coil windings 35A and 35B. When that occurs, the trip coil 36 is energized to operate plunger 39 and tang 41 is moved to actuate the armature 47 in trip mechanism 90 of the right hand load contact set of the circuit breaker (FIG. 3). As discussed, tripping one pole of the breaker causes the other poles to be tripped also.

Testing of the ground fault trip mechanism is accomplished by depressing test button 24. This completes a circuit between L1 and neutral lead wire 44 through resistor 42 and test winding 38. The current flow to test winding 38 simulates a ground fault current in conductor 32 and the magnetic field induced in the toroid is sensed by sensing winding 36. Operation occurs as previously described for tripping the breaker.

What has been described is a novel circuit breaker protection device for attachment to a standard circuit breaker and for sensing ground fault currents at a remote location. It is recognized that numerous changes in the described embodiment of the invention will be apparent to those skilled in the art without departing from its true spirit and scope. The invention is to be limited only as defined in the claims.

What is claimed is:

1. For use with a multi pole circuit breaker including a plurality of load contact sets in a breaker housing, operating means for simultaneously opening and closing said load contact sets, trip means for opening said load contact sets in the event of an overcurrent condition and an aperture in the housing permitting access to said trip means, a ground fault protection mechanism comprising:
   a remote housing defining an orifice;
   a toroid in said remote housing including a magnetically permeable core having a window aligned with said orifice;
   a sensing winding wound on said core;
   trip coil means coupled to said sensing winding and including first and second windings independently connected to said load contact sets for actuating said trip means responsive to said sensing winding via said aperture, each of said first and second windings being individually capable of actuating said trip means; and
   a ground faulty current carrying conductor extending through said orifice.

2. The mechanism of claim 1, further including a test winding wound on said core, and test means for passing a current through said test winding to simulate a fault condition in said ground fault carrying conductor.

3. The mechanism of claim 2 wherein said trip coil means is included in an adapter housing that is attached to said breaker housing and further including mechanical means extending between said adapter housing and said breaker housing through said aperture for actuating said trip means responsive to actuation of said trip coil means.

4. The mechanism of claim 3 wherein said trip coil means further includes:
   an SCR;
   a bridge rectifier having one pair of opposed terminals connected to respective ones of said first and second operating windings and an opposite pair of opposed terminals connected to said SCR; and
   means for triggering said SCR responsive to voltage developed by said sensing winding.

5. For use with a multi pole circuit breaker including, in a breaker housing, a plurality of load contact sets, operating means for simultaneously opening and closing said load contact sets, trip means for opening said load contact sets under overload conditions and an aperture in the housing permitting access to said trip means, a ground fault protection mechanism comprising:
- a remote housing defining an orifice;
- a magnetic toroid in said remote housing including a magnetically permeable core having a window aligned with said orifice;
- a sensing winding positioned on said core;
- an adapter housing affixed to said breaker housing and including mechanical means extending between said adapter housing and said breaker housing through said aperture;
- trip coil means, coupled to said sensing winding, in said adapter housing and including first and second windings independently connected to said load contact sets and being individually capable of actuating said trip means responsive to said sensing winding for actuating said trip means via said mechanical means;
- a ground fault current carrying conductor extending through said orifice;
- a test winding on said core; and
- test means for passing a current through said test winding to simulate a fault condition in said ground fault carrying conductor.

6. The mechanism of claim 5 wherein said trip coil means further includes:
- an SCR;
- a bridge rectifier having one pair of opposed terminals connected to respective ones of said first and second windings and an opposite pair of opposed terminals connected to said SCR; and
- means for triggering said SCR in response to voltage developed by sensing winding.

* * * * *